US010027591B1

(12) United States Patent
Rao et al.

(10) Patent No.: US 10,027,591 B1
(45) Date of Patent: Jul. 17, 2018

(54) APPARATUS, SYSTEM, AND METHOD FOR APPLYING POLICIES TO NETWORK TRAFFIC ON SPECIFIC DAYS

(71) Applicant: Juniper Networks, Inc., Sunnyvale, CA (US)

(72) Inventors: Anand Narayanan Rao, C.V. Raman Nagar (IN); Prasad Chigurupati, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 255 days.

(21) Appl. No.: 14/674,616

(22) Filed: Mar. 31, 2015

(51) Int. Cl.
*G06F 13/00* (2006.01)
*H04L 12/813* (2013.01)
*H04W 28/12* (2009.01)

(52) U.S. Cl.
CPC .............. *H04L 47/20* (2013.01); *H04W 28/12* (2013.01)

(58) Field of Classification Search
CPC ......... H04L 47/28; H04L 47/10; H04L 47/20; H04W 28/12
USPC .......................... 709/232, 231, 230, 224, 223
See application file for complete search history.

(56) References Cited

U.S. PATENT DOCUMENTS

| 8,284,780 | B2 * | 10/2012 | Sullivan | .................. | H04L 47/10 370/395.2 |
| 8,630,925 | B2 * | 1/2014 | Bystrom | .................. | H04L 47/72 705/30 |
| 8,813,180 | B1 | 8/2014 | Chen et al. | | |
| 2009/0046625 | A1 * | 2/2009 | Diener | .................. | H04L 1/0001 370/319 |
| 2009/0180377 | A1 * | 7/2009 | Sullivan | .................. | H04L 47/10 370/230 |
| 2012/0120798 | A1 | 5/2012 | Jacquet et al. | | |
| 2012/0259747 | A1 * | 10/2012 | Bystrom | .................. | H04L 47/72 705/30 |

OTHER PUBLICATIONS

Apoorva Jindal, et al.; Systems and Methods for Interfacing Software-Defined Networks With Non-Software-Defined Networks; U.S. Appl. No. 14/231,493, filed Mar. 31, 2014.
Sudipto Nandi, et al; Apparatus, System, and Method for Predicting Roaming Patterns of Mobile Devices Within Wireless Networks; U.S. Appl. No. 14/664,811, filed Mar. 21, 2015.

(Continued)

*Primary Examiner* — Kenneth R Coulter
(74) *Attorney, Agent, or Firm* — FisherBroyles, LLP (57) ABSTRACT

The disclosed apparatus may include a storage device that stores at least one policy for handling certain network traffic exchanged between multiple computing devices during at least one specific day. The apparatus may also include a policy-enforcement unit communicatively coupled to the storage device. The policy-enforcement unit may receive, at a network device that facilitates network traffic within a network, at least one packet to be exchanged between the multiple computing devices on the specific day. The policy-enforcement unit may then determine, due at least in part to receiving the packet on the specific day, that the policy applies to the packet. In response to determining that the policy applies to the packet, the policy-enforcement unit may handle the packet in accordance with the policy. Various other apparatuses, systems, and methods are also disclosed.

19 Claims, 6 Drawing Sheets

(56) References Cited

OTHER PUBLICATIONS

"Service Control", as accessed Feb. 17, 2015, Juniper Networks, Inc., (Jul. 31, 2014).
"Policy and Charging Rules Function (PCRF)", as accessed Feb. 17, 2015, Wikipedia, (Nov. 14, 2012).
"Oracle Communications Service Broker Policy Controller Implementation Guide—Release 6.1", as accessed Feb. 17, 2015, Oracle, Part Number E29455-01, (Feb. 2013).

* cited by examiner

Apparatus 100

APPARATUS, SYSTEM, AND METHOD FOR APPLYING POLICIES TO NETWORK TRAFFIC ON SPECIFIC DAYS

BACKGROUND

Network devices (such as gateways, routers, and switches) are often used to facilitate network traffic within networks and/or between networks that operate via different protocols. These devices may provide Internet users with fast, flexible, and widespread multi-media communication to various websites and online services. However, in some situations, mobile service providers and/or wireline service providers may want to regulate and/or control network traffic that passes through certain devices within their networks. For example, a mobile service provider or wireline service provider may implement a Policy and Charging Rules Function (PCRF) within a $3^{rd}$ Generation (3G) or $4^{th}$ Generation (4G) network in order to police, gate, re-direct, and/or charge certain rates for network traffic distributed within the network.

Unfortunately, traditional methods for applying policies to network traffic may be unable to accurately and/or efficiently provide network operators with robust, flexible, and/or customizable policies for handling network traffic in various situations. The instant disclosure, therefore, identifies and addresses a need for improved apparatuses, systems, and methods for applying policies to network traffic.

SUMMARY

As will be described in greater detail below, the instant disclosure generally relates to apparatuses, systems, and methods for applying policies to network traffic on specific days. In one example, an apparatus for accomplishing such a task may include a storage device that stores at least one policy for handling certain network traffic exchanged between multiple computing devices during at least one specific day. This apparatus may also include a policy-enforcement unit communicatively coupled to the storage device. The policy-enforcement unit may receive, at a network device that facilitates network traffic within a network, at least one packet to be exchanged between the multiple computing devices on the specific day. The policy-enforcement unit may then determine, due at least in part to receiving the packet on the specific day, that the policy applies to the packet. In response to determining that the policy applies to the packet, the policy-enforcement unit may handle the packet in accordance with the policy.

Similarly, a system incorporating the above-described apparatus may include a storage device that stores at least one policy for handling certain network traffic exchanged between multiple computing devices during at least one specific day of the month. This system may also include a policy-enforcement unit communicatively coupled to the storage device. The policy-enforcement unit may receive, at a network gateway that facilitates network traffic within a network, at least one packet to be exchanged between the multiple computing devices on the specific day of the month. The policy-enforcement unit may then determine, due at least in part to receiving the packet on the specific day of the month, that the policy applies to the packet. In response to determining that the policy applies to the packet, the policy-enforcement unit may handle the packet in accordance with the policy.

A corresponding method may include identifying, at a network device that facilitates network traffic within a network, at least one policy for handling certain network traffic exchanged between multiple computing devices during at least one specific day. This method may also include receiving, at the network device on the specific day, at least one packet to be exchanged between the multiple computing devices. Next, the method may include determining, due at least in part to receiving the packet on the specific day, that the policy applies to the packet. In response to determining that the policy applies to the packet, the method may include handling the packet in accordance with the policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for applying policies to network traffic on specific days. As will be explained in greater detail below, by identifying and/or storing policies within network devices that specify actions to be performed on certain network traffic, the various apparatuses, systems, and methods described herein may apply policies to the certain network traffic on specific days. For example, after receiving policies from a mobile service provider or a wireline service provider, the various apparatuses, systems, and methods described herein may police, gate, re-direct, and/or charge certain network traffic exchanged between computing devices and online applications. Furthermore, the various apparatuses, systems, and methods described herein may enforce such policies for multiple days.

Figure 1:
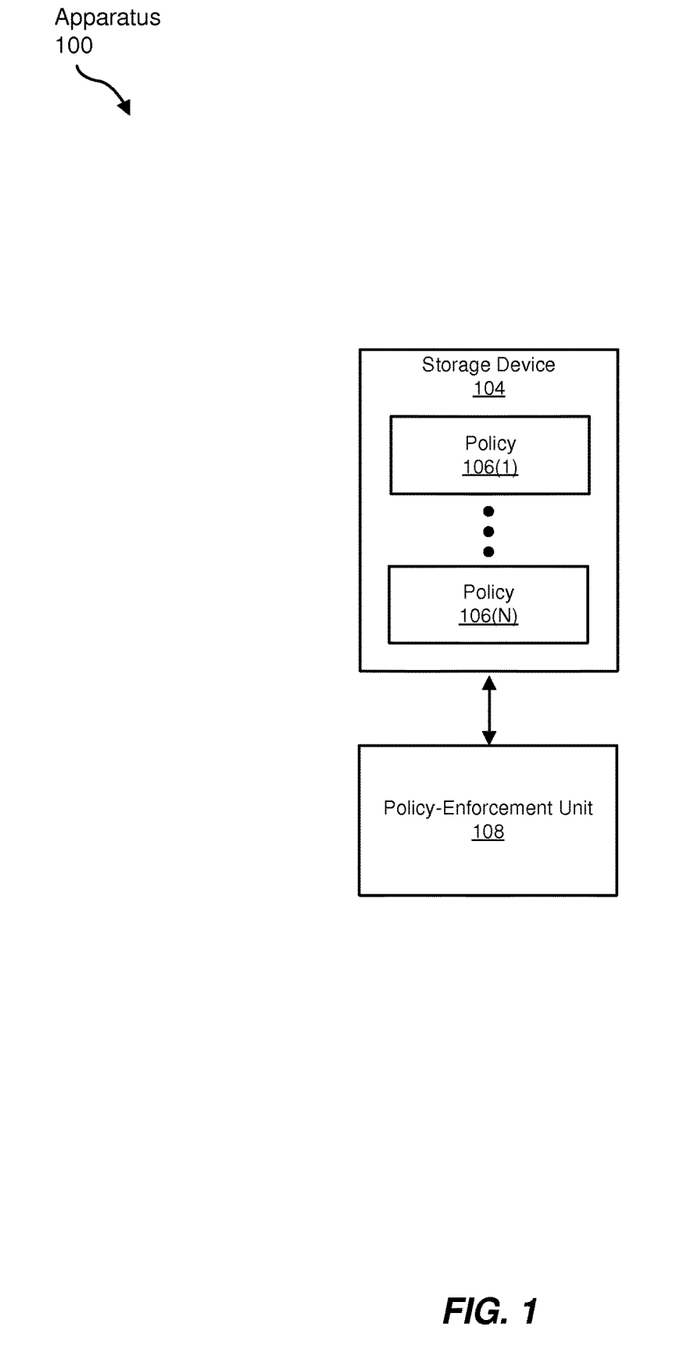
FIG. 1 is a block diagram of an exemplary apparatus for applying policies to network traffic on specific days.

The following will provide, with reference to FIG. 1, a detailed description of an exemplary apparatus that facilitates applying policies to network traffic on specific days. The discussion corresponding to FIG. 2 will provide a detailed description of an exemplary implementation that facilitates applying policies to network traffic on specific days. In addition, the discussion corresponding to FIGS. 3 and 4 will provide detailed descriptions of an exemplary policy for handling network traffic received at a network device on a specific day and an exemplary packet received at a network device on a specific day, respectively. The discussion corresponding to FIG. 5 will provide a detailed description of an exemplary method for applying policies to network traffic on specific days. Finally, the discussion corresponding to FIG. 6 will provide numerous examples of systems that may include the apparatus shown in FIG. 1.

FIG. 1 shows a block diagram of an exemplary apparatus 100 for applying policies to network traffic on specific days. The term "network traffic," as used herein, generally refers to any type or form of data transfer occurring within a network and/or passing from one network to another. In some examples, network traffic may refer to the transfer of one or more packets between multiple computing devices. The terms "packet" and "data packet," as used herein, generally refer to any type or form of package, encapsulation, abstraction, and/or object that includes one or more formatted units of data.

As illustrated in FIG. 1, apparatus 100 may include a storage device 104 communicatively coupled to a policy-enforcement unit 108. The term "storage device," as used herein, generally refers to any type or form of digital memory, system, and/or mechanism capable of storing, recording, accessing, and/or distributing data. In some examples, storage device 104 may include, store, and/or access policies 106(1)-(N). The term "policy," as used herein, generally refers to any one or combination of rules, guidelines, directions, and/or limitations that define, dictate, or specify how to handle packets received at and/or forwarded from a network device. As will be explained in connection with FIG. 2, policies 106(1)-(N) may specify actions that police, gate, re-direct, and/or apply certain rates to network traffic during specific days and/or during certain hours of specific days.

In addition, the term "policy-enforcement unit," as used herein, generally refers to any type, form, or portion of physical hardware, circuit, device, and/or processor that performs certain Input/Output (I/O) operations and/or computing tasks directed to applying policies to certain network traffic on specific days. In one example, policy-enforcement unit 108 may represent an integrated circuit whose configuration and/or infrastructure is at least partially fixed. Additionally or alternatively, policy-enforcement unit 108 may represent an integrated circuit whose configuration and/or infrastructure is at least partially variable and/or programmable. Examples of policy-enforcement unit 108 include, without limitation, Field Programmable Gate Arrays (FPGAs), Central Processing Units (CPUs), processors, microprocessors, microcontrollers, Application-Specific Integrated Circuits (ASICs), software modules installed on one or more of the same, portions of one or more of the same, variations of one or more of the same, combinations of one or more of the same, or any other suitable policy-enforcement unit.

Figure 2:
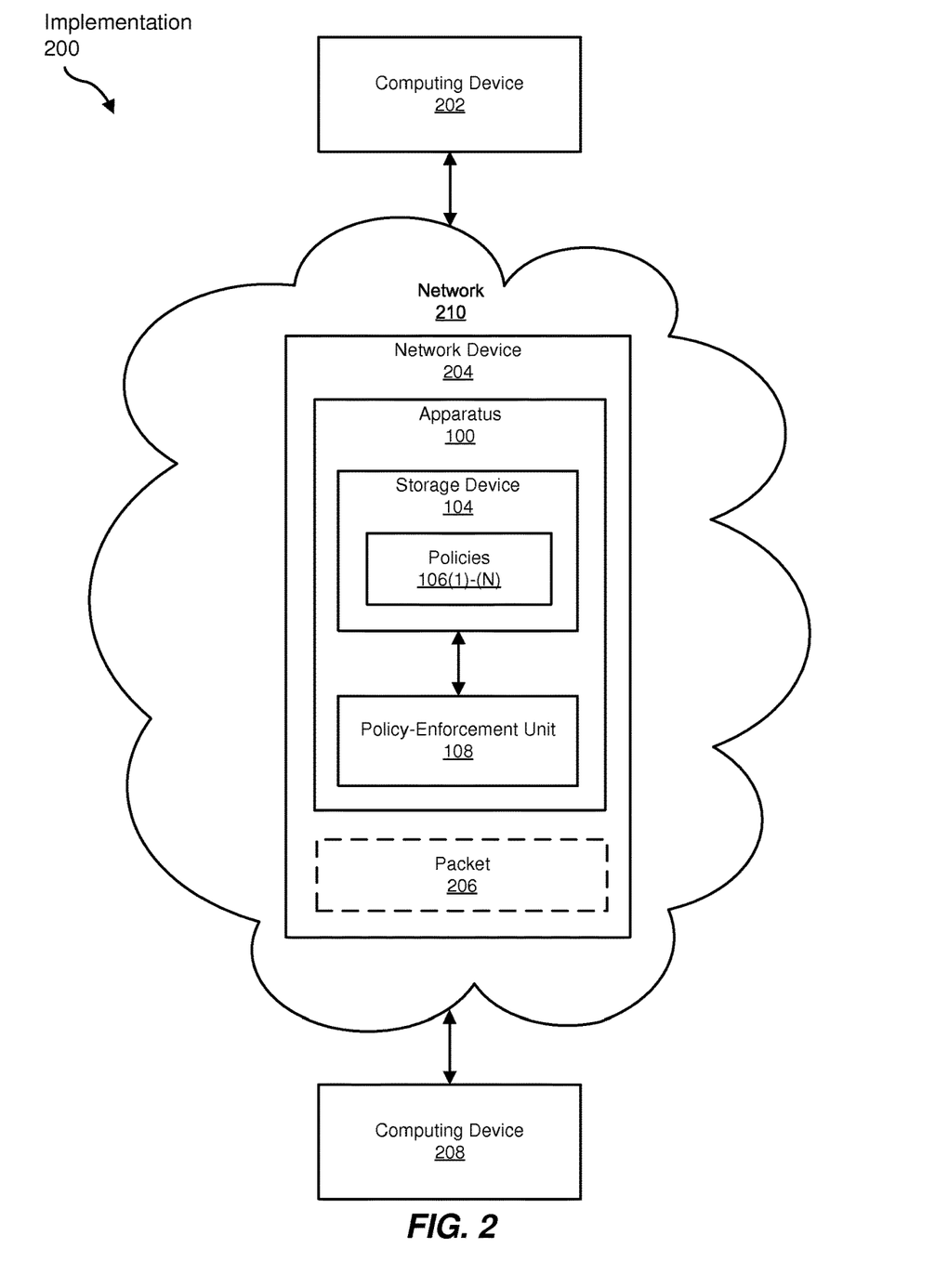
FIG. 2 is a block diagram of an exemplary implementation of an apparatus for applying policies to network traffic on specific days.

FIG. 2 shows a block diagram of an exemplary implementation 200 that includes apparatus 100 for applying policies to network traffic on specific days. As illustrated in FIG. 2, implementation 200 may include a computing device 202 and a computing device 208 in communication with each other via a network 210. In this example, network 210 may include a network device 204 that facilitates and/or regulates communication between computing devices 202 and 208. Although illustrated as separate entities in FIG. 2, computing devices 202 and 208 may all represent and/or be considered portions of network 210 along with network device 204. Additionally or alternatively, network device 204 may represent and/or be considered a portion of the infrastructure and/or architecture of network 210 to which one or more of computing devices 202 and 208 are connected.

The term "network," as used herein, generally refers to any type or form of medium and/or architecture that facilitates communication or data transfer. Examples of network 210 include, without limitation, an intranet, a Wide Area Network (WAN), a Local Area Network (LAN), a wireless LAN, a Personal Area Network (PAN), the Internet, a Power Line Communications (PLC) network, a cellular network (e.g., a Global System for Mobile Communications (GSM) network), portions of one or more of the same, variations of one or more of the same, combinations of one or more of the same, or any other suitable network. Network 210 may facilitate communication or data transfer using wireless and/or wired connections.

In addition, the term "network device," as used herein, generally refers to any type or form of device, apparatus, system, and/or application capable of routing and/or forwarding network traffic among devices within a single network (e.g., a LAN) or between multiple networks (e.g., multiple WANs). Examples of network device 204 include, without limitation, routers, switches, modes, hubs, repeater, combinations of one or more of the same, variations of one or more of the same, and/or any additional type of network device.

In an exemplary embodiment, network device 204 may represent a network gateway that connects and/or interfaces multiple networks that operate under different protocols. In this embodiment, network device 204 may receive packets from computing device 202, computing device 208, and/or an additional computing device not illustrated within FIG. 2. Network device 204 may then translate or convert the packets to a certain protocol in order to forward the packets to their intended destination. As an example, network device 204 may receive a packet originating from a mobile network and re-format the packet such that the packet may be forwarded to a server that hosts an online application outside of the mobile network.

The term "online application," as used herein, generally refers to any type or form of website, platform, or other service accessible via the Internet. In an exemplary embodiment, an online application may be a mobile website configured for access via mobile devices. In addition, an online application may include a domain (e.g., google.com) and any webpages that include the domain (e.g., www.google.com/maps).

In some examples, network device 204 may represent a Service Control Gateway (SCG) that allows mobile service providers and/or wireline service providers to deploy and enforce policies for network traffic. In an exemplary embodiment, network device 204 may be configured to statically enforce Application Detection and Control (ADC) and/or Policy and Charging Control (PCC) rules. For example, network device 204 may enforce ADC and/or PCC rules without implementing a dynamic Policy and Charging Rules Function (PCRF). As such, network device 204 may provide Traffic Detection Functionality (TDF) services for network service providers who are unable to and/or who do not wish to deploy a PCRF.

As illustrated in FIG. 2, network device 204 may include all or a portion of apparatus 100 in FIG. 1. For example, storage device 104 and policy-enforcement unit 108 may represent any portion of memory and/or execution space within and/or in communication with network device 204. In this example, network device 204 may receive, store, access, and/or enforce policies 106(1)-(N) within storage device 104 via policy-enforcement unit 108.

In some embodiments, policy-enforcement unit 108 within network device 204 may receive one or more of policies 106(1)-(N) from a network service provider. The term "network service provider," as used herein, generally refers to any type or form of organization or enterprise that provides network and/or communication services (e.g., text or other media-based messages, phone calls, Internet access, etc.) to users of computing devices. In particular, a mobile service provider may provide network services to users of mobile devices, while a wireline service provider may provide network services via wired connections. Additionally or alternatively, policy-enforcement unit 108 may receive policies 106(1)-(N) from an IT administrator of an organization and/or any other individual or enterprise that wishes to regulate network traffic distributed via network device 204.

As further illustrated in FIG. 2, network device 204 may include a packet 206. In some examples, network device 204 may receive packet 206 from computing device 202, computing device 208, or an additional computing device not illustrated within FIG. 2. In these examples, policy-enforcement unit 108 within network device 204 may determine that one or more of policies 106(1)-(N) apply to packet 206 and then handle packet 206 in accordance with the applicable policies.

Computing device 202 and computing device 208 generally represent any type or form of device capable of sending and/or receiving packets. Examples of computing devices 202 and 208 include, without limitation, desktop computers, laptops, mobile devices, Internet-enabled televisions and BLU-RAY players, servers, network devices, variations of one or more of the same, combinations of one or more of the same, and/or any other suitable types of computing devices.

In an exemplary embodiment, computing device 202 may represent a computing device of a user, and computing device 208 may represent a server that hosts an online application. In this embodiment, a network service provider (e.g., a mobile service provider or wireline service provider) that provides network services to computing device 202 may distribute policies 106(1)-(N) to network device 204. Specifically, the network service provider may provide policies 106(1)-(N) in order to regulate certain network traffic exchanged between the computing devices managed by the network service provider and particular online applications.

In some examples, policies 106(1)-(N) may apply to certain network traffic only during specific time periods. For example, policies 106(1)-(N) may apply to certain network traffic during any one or combination of days of the week, days of the month, and/or dates of the year. As an example, one or more of policies 106(1)-(N) may only be in effect during a holiday (e.g., Christmas, Thanksgiving, etc.) and/or the days surrounding a holiday. As another example, one or more of policies 106(1)-(N) may be in effect during the days in which a sale is being offered via a retailer's online shopping service.

In some examples, policies 106(1)-(N) may apply to the certain network traffic during repeated sets of days, such as during weekends or certain days of the month (e.g., the $1^{st}$-$5^{th}$ days of each month, the last 5 days of each month, etc.). In addition, policies 106(1)-(N) may apply to the certain network traffic starting at a certain time on one day and ending at a certain time on another day. For example, one of policies 106(1)-(N) may be in effect beginning at 5:00 PM on the $10^{th}$ day of each month and remain in effect until 2:00 AM on the $14^{th}$ day of each month. Furthermore, policies 106(1)-(N) may apply to the certain network traffic during certain hours of specific days. As an example, one of policies 106(1)-(N) may be in effect between the hours of 3:00 PM and 6:00 PM on the $2^{nd}$-$8^{th}$ days of each month.

In addition, policies 106(1)-(N) may specify any type or form of action to be applied to the certain network traffic. In some examples, policies 106(1)-(N) may police network traffic (e.g., limit the amount of network traffic) exchanged between computing device 202 and computing device 208. For example, one or more of policies 106(1)-(N) may limit the bandwidth (e.g., rate of data exchange) between the devices. In another example, one or more of policies 106(1)-(N) may limit the overall amount of data exchanged between the devices. Specifically, one or more of policies 106(1)-(N) may prevent network traffic from being exchanged between computing device 202 and computing device 208 after a certain amount of data (e.g., 50 megabytes (MB)) has already been exchanged between the devices.

Additionally or alternatively, policies 106(1)-(N) may gate (e.g., block) network traffic exchanged between computing device 202 and computing device 208. In some examples, one or more of policies 106(1)-(N) may gate network traffic only in one direction between computing device 202 and computing device 208. For example, one of policies 106(1)-(N) may block network traffic from an online application to a computing device while permitting network traffic to be passed from the computing device to the online application.

In some embodiments, policies 106(1)-(N) may re-direct network traffic to be exchanged between computing device 202 and computing device 208. For example, one or more of policies 106(1)-(N) may specify an alternate network path or alternate destination for network traffic originating from computing device 202 and destined for computing device 208. Specifically, one of policies 106(1)-(N) may re-direct a computing device to an error page or an alternate application in the event that the online application requested by the computing device is unavailable or broken.

Additionally, in some examples, policies 106(1)-(N) may apply certain rates of charge to network traffic exchanged between computing device 202 and computing device 208. As an example, one or more of policies 106(1)-(N) may specify that network traffic exchanged between computing device 202 and computing device 208 is free (e.g., the exchanged data does not count towards the total amount of data allotted to a user of computing device 202). As another example, one or more of policies 106(1)-(N) may specify that network traffic exchanged between computing device 202 and computing device 208 is subject to an increased or decreased rate of charge. For example, one of policies 106(1)-(N) may specify an increased or decreased dollar amount (compared to a base dollar amount) to be charged to a user of computing device 202 for exchanging network traffic between computing device 202 and computing device 208.

Figure 3:
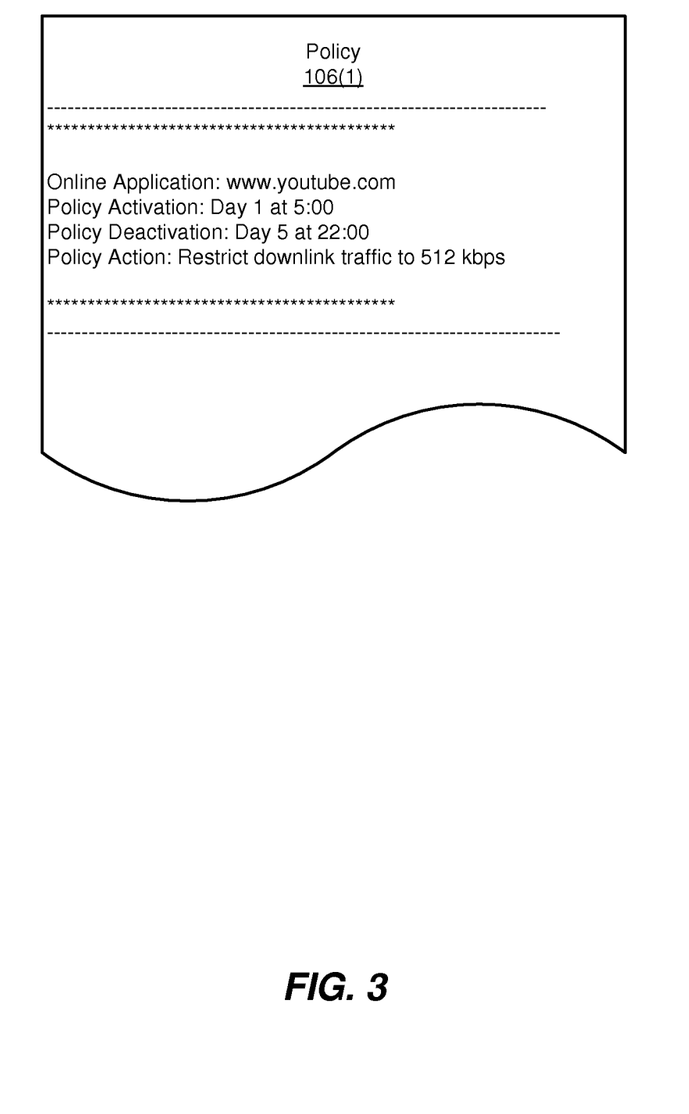
FIG. 3 is an illustration of an exemplary network policy that applies to network traffic on specific days.

As an example, FIG. 3 illustrates a policy 106(1). In this example, policy 106(1) may apply to all network traffic received at network device 204 that originated from the online application "youtube.com." As shown in FIG. 3, policy 106(1) may activate at 5:00 on the 1$^{st}$ day of each month and deactivate at 22:00 on the 5$^{th}$ day of each month. Additionally, as shown in FIG. 3, policy 106(1) may specify an action of restricting downlink traffic (e.g., network traffic sent from youtube.com to an endpoint device) to a rate of 512 kilobytes per second (Kbps).

In order for one of policies 106(1)-(N) to apply to a packet, the packet must have originated from and/or be directed to one or a combination of the computing devices specified by the policy. In addition, the packet must be received during the time period when the policy is active. When packets are received at network device 204, policy-enforcement unit 108 within network device 204 may analyze each received packet to determine whether one or more of policies 106(1)-(N) applies to that packet.

For example, policy-enforcement unit 108 may identify a source and/or destination of each packet to determine whether the source and/or destination corresponds to a computing device (e.g., a server that hosts an online application or a mobile device) identified within one or more of policies 106(1)-(N). Specifically, policy-enforcement unit 108 may identify a source and/or destination domain, a source and/or destination Internet Protocol (IP) address, a source and/or destination Media Access Control (MAC) address, a source and/or destination port, and/or any additional indication of the path of each packet.

Figure 4:
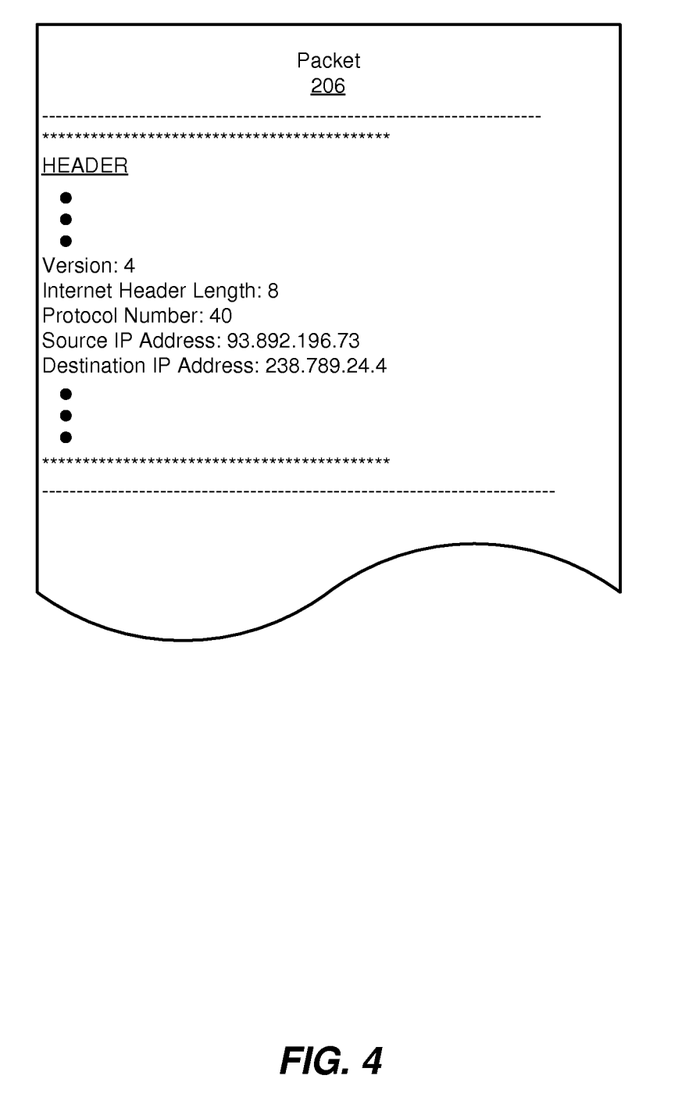
FIG. 4 is an illustration of an exemplary packet received at a network device on a specific day.

FIG. 4 is an illustration of an exemplary packet 206. In this example, the header of packet 206 may contain a variety of information about the formatting of packet 206, such as the version of packet 206 (in this example, "4" indicating Internet Protocol version 4) and the Internet header length of packet 206 (in this example, "8" indicating 8 bits). In addition, policy-enforcement unit 108 may determine that the header of packet 206 contains a source IP address of "93.892.196.73." In this example, policy-enforcement unit 108 may determine that the IP address "93.892.196.73" is assigned to a server that hosts a portion of www.youtube.com. Furthermore, policy-enforcement unit 108 may determine that the header of packet 206 contains a destination IP address of "238.789.24.4." In this example, policy-enforcement unit 108 may determine that the IP address "238.789.24.4" is assigned to a computing device whose data service is provided by the same network service provider that provided policies 106(1)-(N).

After determining that packet 206 originated from www.youtube.com, policy-enforcement unit 108 may determine whether any of policies 106(1)-(N) involving network traffic originating from www.youtube.com are currently active. In one example, policy-enforcement unit 108 may determine that policy 106(1) is currently active and that policy 106(1) applies to packets originating from youtube.com. As such, policy-enforcement unit 108 may determine that policy 106(1) applies to packet 206.

In some embodiments, policy-enforcement unit 108 may enforce policies 106(1)-(N) without a PCRF. For example, policy-enforcement unit 108 may enforce policies 106(1)-(N) using a static SCG. In this example, policy-enforcement unit 108 may identify the times and days during which each of policies 106(1)-(N) are active and automatically handle applicable packets in accordance with policies 106(1)-(N) during those times and days. By enforcing policies 106(1)-(N) without a PCRF, policy-enforcement unit 108 may automatically apply policies 106(1)-(N) to certain network traffic received at network device 204 without analyzing a timestamp within each received packet.

After determining that one or more of policies 106(1)-(N) applies to a packet received at network device 204, policy-enforcement unit 108 may handle the packet in accordance with the applicable policies. As an example, an applicable policy may restrict the amount of data transferred from computing device 208 to computing device 202. As previously described, policy 106(1) in FIG. 3 illustrates such an example. In this example, policy-enforcement unit 108 may determine whether to forward packet 206 in FIG. 4 from computing device 208 (e.g., a server that hosts a portion of youtube.com) to computing device 202 (e.g., a computing device of a user) based at least in part on whether forwarding packet 206 exceeds a certain amount of network traffic (in this example, 512 kbps) allowed to be transferred from computing device 208 to computing device 202.

In the event that the current rate of data transfer from computing device 208 to computing device 202 does not exceed 512 kbps, policy-enforcement unit 108 may direct network device 204 to forward packet 206 to computing device 202 as normal. However, in the event that forwarding packet 206 to computing device 202 would increase the current rate of data transfer from computing device 208 to computing device 202 to a rate greater than 512 kbps, policy-enforcement unit 108 may direct network device 204 to delay or prevent forwarding packet 206 to computing device 202 in order to comply with policy 106(1).

In another example, policy-enforcement unit 108 may determine that network device 204 receives a packet from computing device 202 that is directed towards computing device 208. Policy-enforcement unit 108 may then determine that one of policies 106(1)-(N) applies to the packet. In this example, the applicable policy may state that all data transfer between computing device 202 and computing device 208 should be blocked. As such, policy-enforcement unit 108 may handle the packet in accordance with the policy by preventing network device 204 from forwarding the packet to computing device 208.

Similarly, in an additional example, policy-enforcement unit 108 determine that network device 204 receives an additional packet from computing device 202 that is directed towards computing device 208. Policy-enforcement unit 108 may then determine that another one of policies 106(1)-(N) applies to the additional packet. In this example, the applicable policy may specify an alternate destination for packets originating from computing device 202 and destined for computing device 208. As such, policy-enforcement unit 108 may handle the packet in accordance with the policy by re-directing the packet to the alternate destination instead of computing device 202.

In a further example, policy-enforcement unit 108 may determine that network device 204 receives another packet from computing device 202 that is directed towards computing device 208. Policy-enforcement unit 108 may then determine that another one of policies 106(1)-(N) applies to the packet. In this example, the applicable policy may indicate a certain rate of charge to apply to a user of computing device 202 for exchanging the packet between computing device 202 and computing device 208. As such, policy-enforcement unit 108 may handle the packet in accordance with the policy by directing network device 204 to forward the packet to computing device 208, as well as charging the user of computing device 202 that rate for exchanging the packet between computing device 202 and computing device 208.

Policy-enforcement unit 108 may enforce policies 106(1)-(N) in a variety of ways. In some examples, policy-enforcement unit 108 may enforce policies 106(1)-(N) by extending time-of-day policies. The term "time-of-day policy," as used herein, generally refers to any type or form of policy that may be applied to certain network traffic during specific hours of a day. A time-of-day policy may be implemented in a variety of ways and/or using a variety of devices, such as a PCRF or a static network device (e.g., a JUNIPER SCG).

In these examples, policy-enforcement unit 108 may first identify an online application and/or a computing device that hosts the online application. Policy-enforcement unit 108 may then create or identify an action to be performed on network traffic distributed to and/or from the online application. Next, policy-enforcement unit 108 may create an extended time-of-day profile that indicates the times and/or days during which the action should be applied. For example, instead of creating a time-of-day profile that enforces an action during a few hours each day, policy-enforcement unit 108 may create a time-of-day profile that lasts for multiple days. To complete the policy, policy-enforcement unit 108 may associate the online application with the action and the extended time-of-day profile.

Referring to the example of FIG. 4, policy-enforcement unit 108 may generate policy 106(1) by associating network traffic originating from youtube.com with an action of restricting downlink traffic to 512 kbps. Policy-enforcement unit 108 may then associate the action with a time-of-day profile that begins on the 1$^{st}$ day of each month at 5:00 and ends on the 5$^{th}$ day of each month at 22:00.

Figure 5:
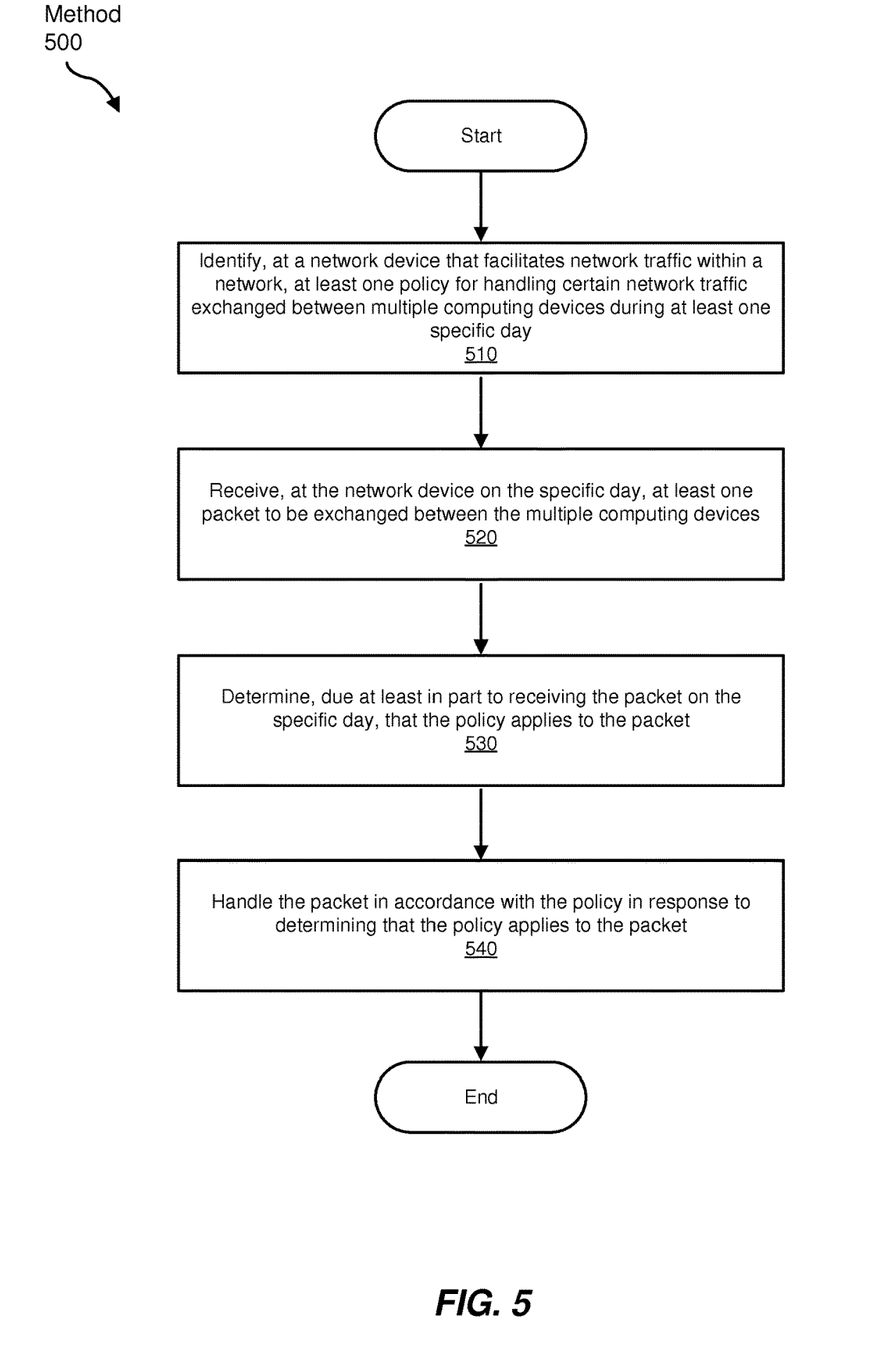
FIG. 5 is a flow diagram of an exemplary method for applying policies to network traffic on specific days.

FIG. 5 is a flow diagram of an exemplary method 500 for applying policies to network traffic on specific days. Method 500 may include the step of identifying, at a network device that facilitates network traffic within a network, at least one policy for handling certain network traffic exchanged between multiple computing devices during at least one specific day (510). This identifying step may be performed in a variety of ways. For example, policy-enforcement unit 108 may, as part of network device 204 in FIG. 2, receive and/or store one or more of policies 106(1)-(N). In some embodiments, policy-enforcement unit 108 may receive policies 106(1)-(N) from a mobile service provider or a wireline service provider that provides network services to computing devices that exchange network traffic with servers that host online applications via network device 204.

Policies 106(1)-(N) may specify any of a variety of conditions, limitations, or restrictions to be imposed on certain network traffic received at and/or forwarded from network device 204. For example, policies 106(1)-(N) may police, gate, re-direct, or apply certain charges to packets exchanged between computing devices and certain online applications. In addition, policies 106(1)-(N) may impose such conditions only during specific time periods, such as certain days of the week, certain days of the month, certain dates of the year, certain hours within days, weekends, holidays, and/or any additional period of time.

Returning to FIG. 5, method 500 may additionally include the step of receiving, at the network device on the specific day, at least one packet to be exchanged between the multiple computing devices (520). This receiving step may be performed in a variety of ways. For example, policy-enforcement unit 108 may, as part of network device 204 in FIG. 2, receive packet 206 from computing device 202 or computing device 208 as packet 206 is exchanged between computing device 202 and computing device 208. In addition, network device 204 may receive packet 206 on the one or more specific days during which a policy (e.g., policy 106(1)) is active.

Returning to FIG. 5, method 500 may further include the step of determining, due at least in part to receiving the packet on the specific day, that the policy applies to the packet (530). This determining step may be performed in a variety of ways. For example, policy-enforcement unit 108 may, as part of implementation 200, determine that policy 106(1) applies to packet 206 based at least in part on receiving packet 206 on the specific day.

In some examples, policy-enforcement unit 108 may determine that packet 206 is to be exchanged between computing device 202 and computing device 208 (e.g., by analyzing a source and/or destination domain, a source and/or destination IP address, a source and/or destination MAC address, and/or a source and/or destination port within packet 206). In addition, policy-enforcement unit 108 may determine that policy 106(1) is currently active and applies to packets exchanged between computing device 202 and computing device 208. Accordingly, policy-enforcement unit 108 may determine that policy 106(1) applies to packet 206.

Returning to FIG. 5, method 500 may also include the step of handling the packet in accordance with the policy in response to determining that the policy applies to the packet (540). This handling step may be performed in a variety of ways. For example, policy-enforcement unit 108 may, as part of network device 204 in FIG. 2, handle packet 206 in accordance with policy 106(1) in response to determining that policy 106(1) applies to packet 206. In this example, policy-enforcement unit 108 may handle packet 206 by policing, gating, re-directing, and/or applying a certain charge to packet 206 as specified and/or defined by policy 106(1).

As explained above in connection with FIGS. 1-5, a network device may store one or more policies for handling certain network traffic received at the network device on specific days. After receiving a packet on a specific day during which a policy is active, the network device may determine that the policy applies to the packet. For example, the network device may determine that the packet is directed to or from an online application specified in the policy. In response to determining that the policy applies to the packet, the network device may handle the packet in accordance with the policy. For example, the network device may police, gate, re-direct, charge a certain rate to, and/or otherwise handle the packet according to an action specified by the policy.

Figure 6:
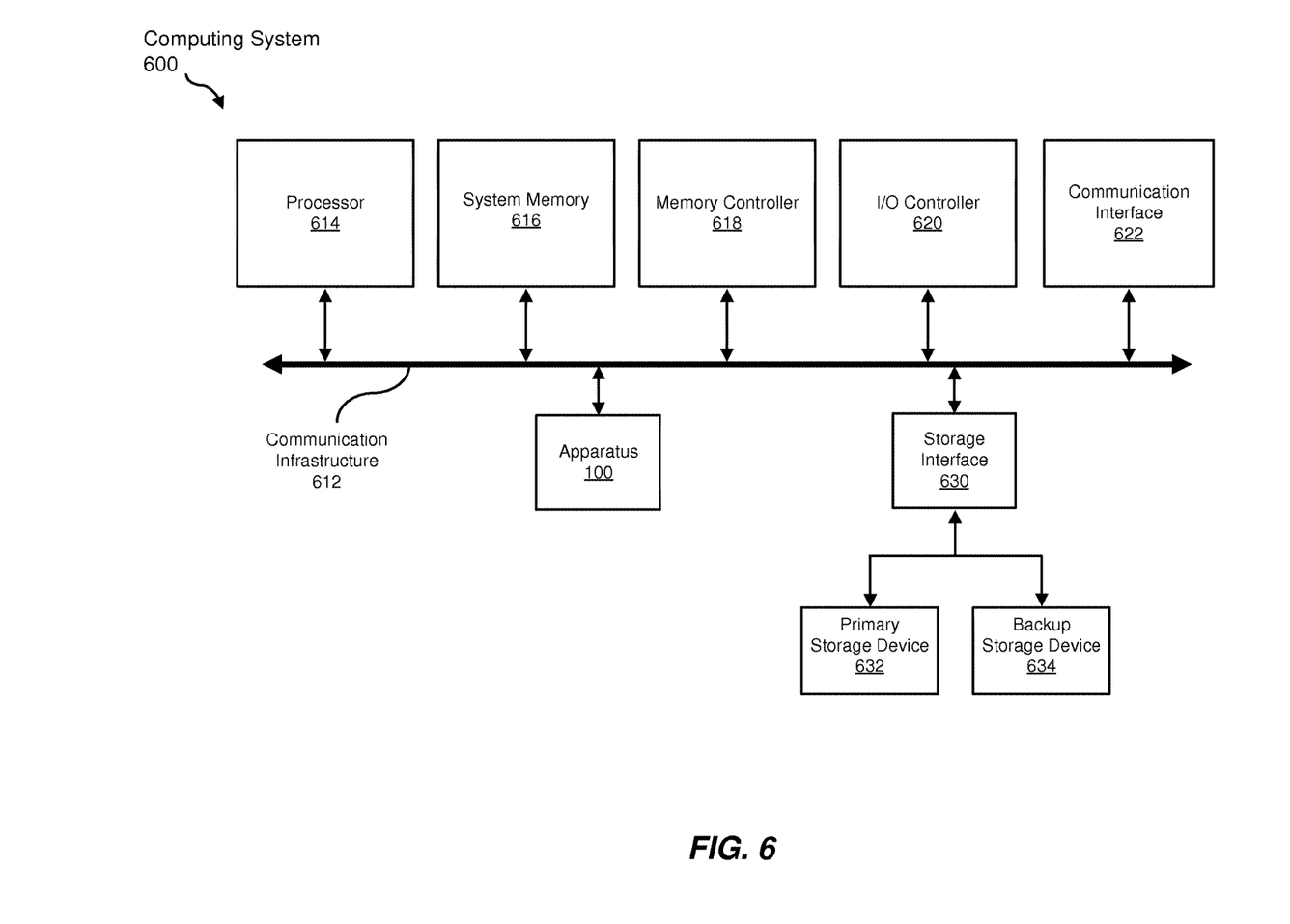
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 5. All or a portion of computing system 600 may also perform and/or be a means for performing and/or implementing any other steps, methods, or processes described and/or illustrated herein. In one example, computing system 600 may include apparatus 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   at least one storage device that stores at least one policy for handling certain network traffic destined for an online application during at least one specific day;
   at least one policy-enforcement unit communicatively coupled to the storage device, wherein the policy-enforcement unit:
   configures the policy by:
      creating an extended time-of-day profile that identifies a period of time in which the policy is to be applied; and
      associating the extended time-of-day profile with the certain network traffic destined for the online application;
   activates the policy on the specific day;
   receives, while the policy is activated, at a network device that facilitates network traffic within a network, at least one packet destined for the online application; and
   handles the packet in accordance with the activated policy without analyzing a timestamp within the packet.

2. The apparatus of claim 1, wherein the network device comprises a network gateway that facilitates network traffic between at least two wireless networks.

3. The apparatus of claim 2, wherein:

the network gateway facilitates network traffic between at least two networks that operate under different protocols; and the policy-enforcement unit handles the packet in accordance with the activated policy by:
identifying a protocol of a destination network of the packet; and
re-formatting the packet to be compatible with the protocol of the destination network.

4. The apparatus of claim 3, wherein:
a source network of the packet comprises a mobile network; and
the destination network of the packet comprises a non-mobile network.

5. The apparatus of claim 1, wherein:
the policy comprises a policy for handling network traffic exchanged between at least one computing device of a user and at least one server that hosts the online application; and
before handling the packet in accordance with the activated policy, the policy-enforcement unit determines that the activated policy applies to the packet by determining that the packet is to be exchanged between the computing device of the user and the server that hosts the online application.

6. The apparatus of claim 5, wherein the storage device receives the policy for handling network traffic exchanged between the computing device of the user and the server that hosts the online application from at least one network service provider that provides network services to the computing device of the user.

7. The apparatus of claim 1, wherein the specific day comprises at least one of:
at least one day of the week;
at least one day of the month; and
at least one date of the year.

8. The apparatus of claim 1, wherein the policy comprises a policy for handling network traffic destined for the online application during certain hours within specific days of the month.

9. The apparatus of claim 1, wherein the policy-enforcement unit handles the packet in accordance with the activated policy by determining whether to forward the packet to the online application based at least in part on whether forwarding the packet to the online application exceeds a certain amount of network traffic, specified by the policy, that is allowed to be forwarded to the online application.

10. The apparatus of claim 1, wherein the policy-enforcement unit handles the packet in accordance with the activated policy by preventing the packet from being forwarded to the online application.

11. The apparatus of claim 1, wherein the policy-enforcement unit handles the packet in accordance with the activated policy by routing the packet to the online application along a certain network path specified by the policy.

12. The apparatus of claim 1, wherein the policy-enforcement unit handles the packet in accordance with the activated policy by charging a user of a computing device from which the packet originated a certain rate, specified by the policy, for forwarding the packet to the online application.

13. The apparatus of claim 1, wherein the policy-enforcement unit activates the policy by statically enforcing an Application Detection and Control (ADC) rule, rather than dynamically implementing a Policy and Charging Rules Function (PCRF).

14. The apparatus of claim 13, wherein statically enforcing the ADC rule rather than dynamically implementing the PCRF enables the policy-enforcement unit to handle the packet in accordance with the activated policy without analyzing the timestamp within the packet.

15. A system comprising:
at least one storage device that stores at least one policy for handling certain network traffic destined for an online application during at least one specific day of the month;
at least one policy-enforcement unit communicatively coupled to the storage device, wherein the policy-enforcement unit:
configures the policy by:
creating an extended time-of-day profile that identifies a period of time in which the policy is to be applied; and
associating the extended time-of-day profile with the certain network traffic destined for the online application;
activates the policy on the specific day of the month;
receives, while the policy is activated, at a network gateway that facilitates network traffic between at least two networks, at least one packet destined for the online application; and
handles the packet in accordance with the activated policy without analyzing a timestamp within the packet.

16. The system of claim 15, wherein:
the policy comprises a policy for handling network traffic exchanged between at least one computing device of a user and at least one server that hosts the online application; and
before handling the packet in accordance with the activated policy, the policy-enforcement unit determines that the activated policy applies to the packet by determining that the packet is to be exchanged between the computing device of the user and the server that hosts the online application.

17. The system of claim 16, wherein the storage device receives the policy for handling network traffic exchanged between the computing device of the user and the server that hosts the online application from at least one network service provider that provides network services to the computing device of the user.

18. The system of claim 15, wherein the policy comprises a policy for handling network traffic destined for the online application during certain hours within specific days of the month.

19. A method comprising:
configuring, at a network device that facilitates network traffic within a network, at least one policy for handling certain network traffic destined for an online application during at least one specific day by:
creating an extended time-of-day profile that identifies a period of time in which the policy is to be applied; and
associating the extended time-of-day profile with the certain network traffic destined for the online application;
activating the policy on the specific day;
receiving, while the policy is activated, at the network device, at least one packet destined for the online application; and
handling the packet in accordance with the activated policy without analyzing a timestamp within the packet.

* * * * *